United States Patent [19]
Thorsnes, Jr.

[11] 3,927,485
[45] Dec. 23, 1975

[54] WATER FOWL DECOY

[76] Inventor: John Thorsnes, Jr., 2416 N. Florida St., Arlington, Va. 22207

[22] Filed: Sept. 13, 1974

[21] Appl. No.: 505,897

[52] U.S. Cl. .................................................. 43/3
[51] Int. Cl.² ...................................... A01M 31/06
[58] Field of Search .......................................... 43/3

[56] References Cited
UNITED STATES PATENTS

| | | | |
|---|---|---|---|
| 1,468,979 | 9/1923 | Sherman et al. | 43/3 |
| 2,196,078 | 4/1940 | Pearce | 43/3 |
| 2,237,194 | 4/1941 | Ohnmacht | 43/3 |
| 2,457,295 | 12/1948 | Woodhead | 43/3 |
| 2,816,383 | 12/1957 | Locher | 43/3 |

Primary Examiner—Louis G. Mancene
Assistant Examiner—Daniel J. Leach
Attorney, Agent, or Firm—Pollock, Philpitt & Vande Sande

[57] ABSTRACT

A water fowl decoy of the floating type includes a resiliently mounted neck and head portion adapted to pivot relative to the decoy body in response to an operator's remote actuation, thereby simulating a feeding bird. Means are also provided for collapsing the neck and head portion into a recess in the body to facilitate storage or transportation of the decoy.

7 Claims, 4 Drawing Figures

WATER FOWL DECOY

BACKGROUND OF THE INVENTION

Sportsmen and hunters have for centuries sought to develop a water fowl decoy which might be used to attract birds flying over head to a location sufficiently close to the hunter to permit the hunter to obtain a clear shot or close view of the bird. Similar problems have effected naturalists and bird lovers over the years who have sought to attract the objects of their attention to a sufficiently close distance to permit adequate observation of their habits and physical characteristics.

Numerous solutions to these problems have been suggested over the years, the most well known one being the conventional buoyant decoy which is placed in the water near the hunter's blind or naturalist's observation point. Such prior art decoys simulate the appearance of the water fowl above the water line. An obvious disadvantage of such decoys is that they are inanimate and thus simulate the natural water fowl only in appearance. Other, more simple types of decoys are known which comprise one or more flat silhouette elements which may be placed on land adjacent the water or in the water to represent a water fowl when seen from directly above or from directly at the side. These simpler decoys are subject to the same deficiencies as their more natural looking counter parts.

Another difficulty which has arisen with decoys of the more natural appearing variety is that many water fowl have rather large bodies which include elongated necks extending a substantial distance from the body. The elongated neck portions of such decoys are frequently rather fragile and subject to breakage. In addition, they add substantially to the amount of space occupied by the decoy when it is not in use. Fragile decoys are a disadvantage to the hunter or naturalist since they must frequently be carried some distance to a desired observation point without breakage. Large decoys are also a disadvantage since they are cumbersome to handle and transport.

SUMMARY OF THE INVENTION

An object of this invention is to provide a water fowl decoy which closely simulates the appearance of a natural water fowl floating on the surface of a body of water, while also including means for simulating the natural movements of a water fowl during feeding.

Another object of this invention is to provide a water fowl decoy including means for collapsing the neck and head portion into the body of the decoy to protect the neck and head portions from damage and provide a more compact device for transportation and storage.

The above objects of the invention are intended to be merely exemplary and other objects achieved by the invention may occur to those skilled in the art; however, the scope of the invention is to be limited only by the appended claims.

These and other objects of the invention are achieved by the disclosed decoy which may comprise a buoyant body member simulating the general appearance of a natural water fowl's body when at rest on the surface of a body of water, a neck and head portion pivoted to said body member and simulating the appearance of a natural water fowl's neck and head; means connected to the body member and to the neck and head portion for resiliently restraining the neck and head portion in a natural, elevated position; and means connected to the neck and head portion for causing it to pivot relative to the body member in opposition to the resilient restraining means, whereby the decoy will simulate the appearance of a natural water fowl while resting on the surface of the water and while feeding. In other embodiments of the invention, the body member may include a recess located in its under portion into which the neck and head portion may be rotated after disengagement of the resilient restraining means.

DETAILED DESCRIPTION OF THE PREFERRED EMBODIMENT

Figure 1:
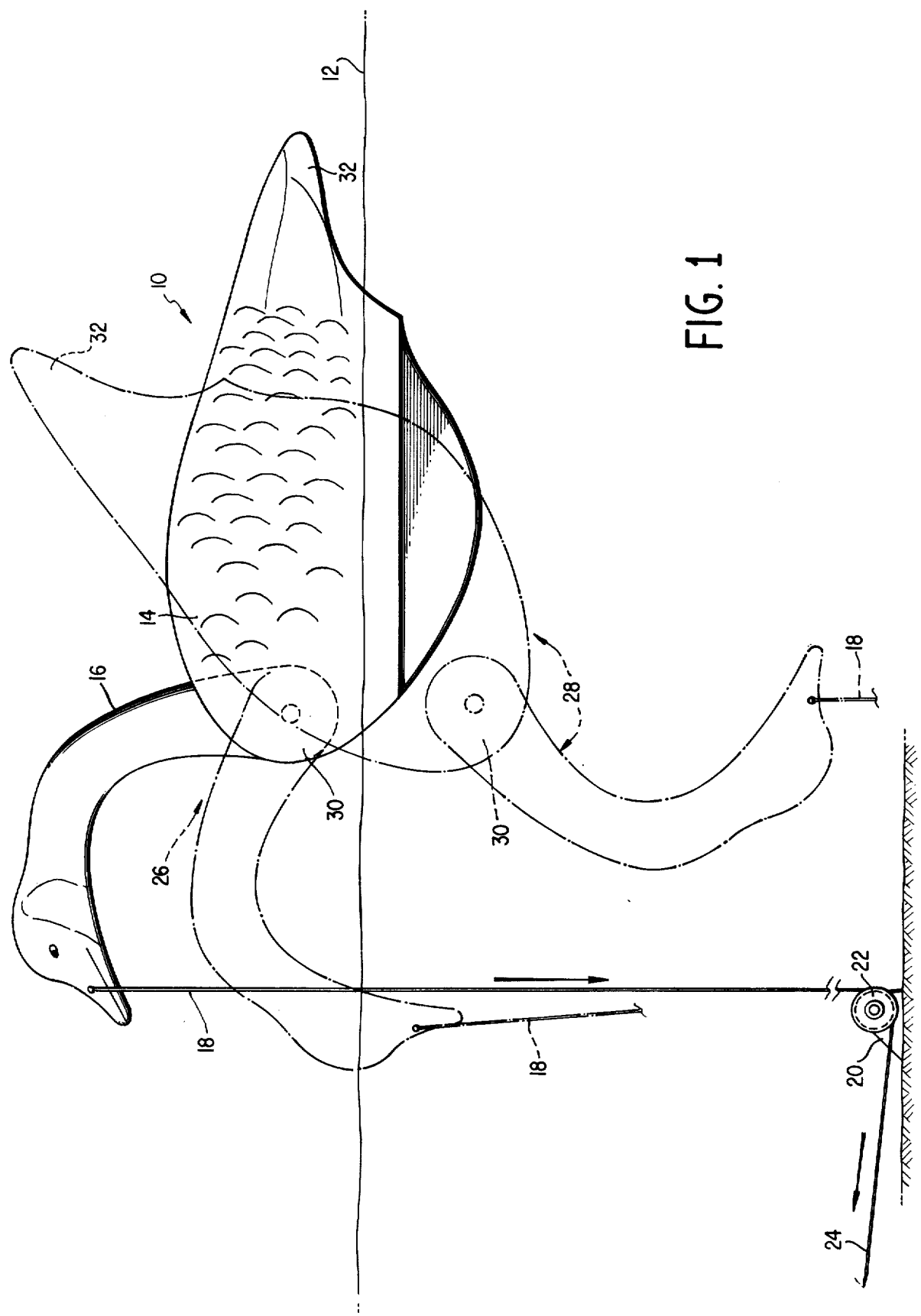
FIG. 1 shows a side elevation view of a decoy according to the invention, indicating some of the various positions assumable by the inventive decoy in response to actuating forces applied by the operator.

There follows a detailed description of the invention, reference being had to the attached drawings, in which like reference numerals identify like elements of structure in each of the several Figures.

Referring now to FIG. 1, a decoy 10 according to the invention is shown in the position it would assume when placed on the surface 12 of a body of water. Decoy 10 comprises a body element 14 which closely simulates the exterior appearance of a water fowl body as would appear to an observer when the bird is resting on the water surface. The underside of the breast and tail portions are also naturally represented. Extending from body element 14 is a neck and head portion 16 which likewise simulates the corresponding portion of the actual water fowl body. Body element 14 and head and neck portion 16 may be made of any suitable buoyant substance such as wood, plastic foam or other material which is textured and painted on its surface as necessary to duplicate the exterior appearance of a particular bird. FIG. 1 illustrates a decoy simulating the appearance of a Canadian goose; however, the teachings of the invention may obviously be adapted to use with any type of water fowl.

A lanyard 18 of cat gut, translucent nylon or similar material is attached to neck and head portion 16 at a location near its outer extremity. Located on the bottom of the body of water is an anchor 20 to which is attached a swivel pulley 22 through which is threaded lanyard 18. An actuating segment 24 of lanyard 18 is led from pulley 22 to a remote location where the hunter or naturalist may pull on the lanyard to simulate natural movement of an actual water fowl, as will be discussed subsequently. Numerals 26 and 28 refer to the phantom positions of the decoy which indicate possible first and second feeding positions which the decoy may assume when actuated by the operator. As shown in position 28, the head end 30 of the decoy tips into the water and the tail end 32 raises out of the water in one feeding position.

Figure 2:
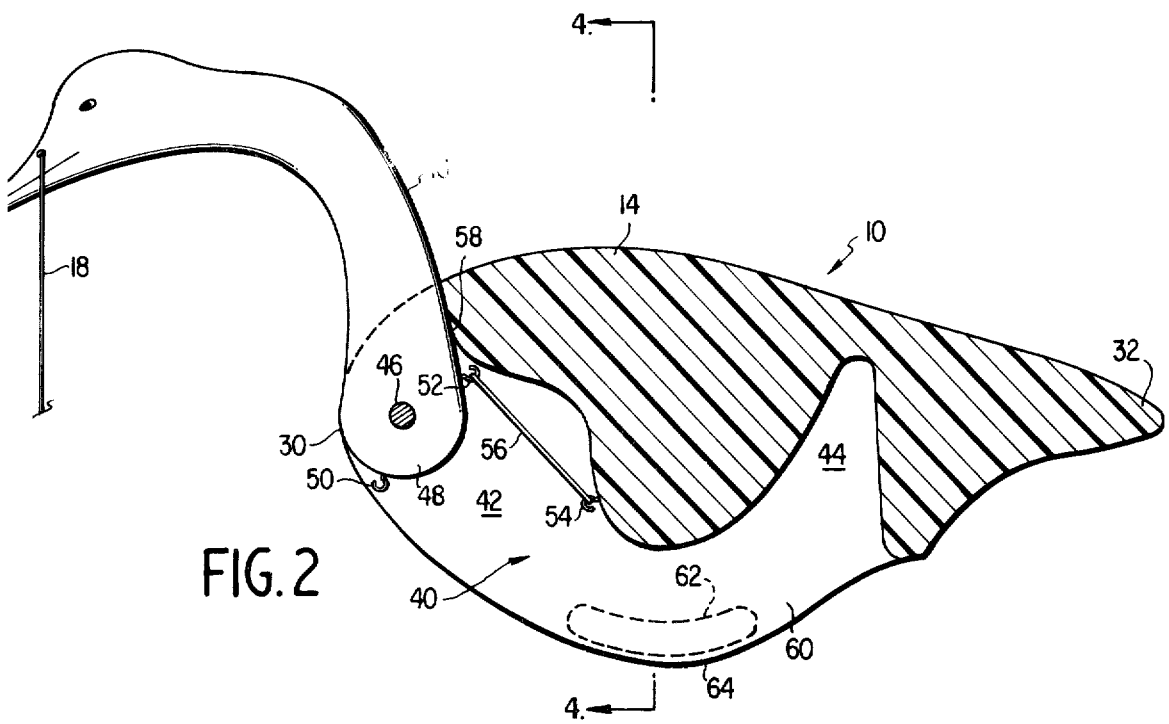
FIG. 2 shows a side elevation view, partially in section, of a decoy according to the invention indicating the unique storage recess and resilient restraining means of the invention.
Figure 4:
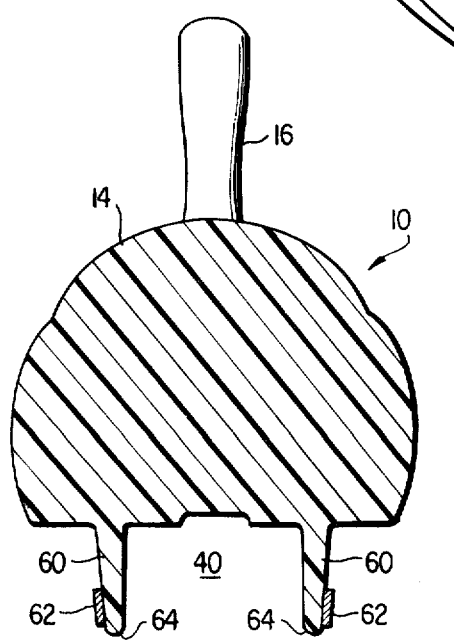
FIG. 4 shows a view taken along line 4—4 of FIG. 2 indicating the orientation of the recess located in the under portion of the decoy body and the stablizing keels according to the invention.

Turning now to FIG. 2, a vertical section taken along the fore and aft center line of the decoy indicates the interior structure according to the invention. A longitudinal recess 40 is provided on the under side of the decoy as indicated. Recess 40 includes a pivot end 42 and a neck and head protecting portion 44. Neck and head portion 16 is pivoted within recess 40 at 46. The lower end 48 of neck and head portion 16 is essentially semi-cylindrical in configuration and includes affixed to the periphery thereof attachment hooks 50 and 52 for purposes to be discussed. Attached to the inner wall of recess 40 at a location remote from hook 52 when neck and head portion is in its illustrated vertical position is a body hook 54. Stretched between hooks 52 and 54 is resilient element 56 which may be a strong elastic band coil, spring or similar device, as desired. Resilient element 56 serves to restrain neck and head portion 16 in an essentially vertical position wherein the rear surface of neck and head portion 16 abuts stop surface 58 as indicated. If desired, a rigid connector such as a hook may be used to restrain neck and head portion 16, in place of element 56. As shown more clearly in FIG. 4, the under surface of decoy 10 includes a pair of stablizing keels 60 located on either side of recess 40 which include weights 62 at their lower ends for stablizing the decoy in a vertical position.

Figure 3:
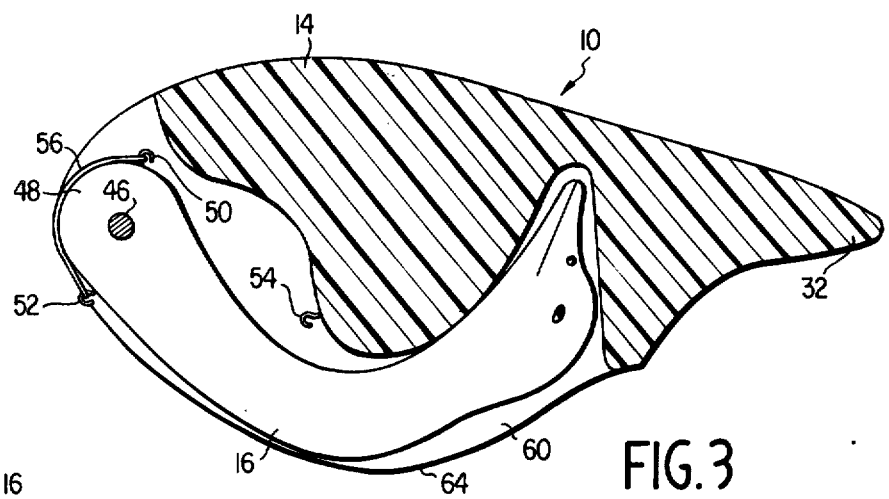
FIG. 3 shows a side elevation view, partially in section, indicating the position assumed by the neck and head portion of the decoy in the storage position.

FIG. 3 shows decoy 10 in its collapsed position wherein it is suited for transportation or storage. By reaching into recess 40, the operator may disconnect resilient element 56 from hook 54 and attach it to hook 50 located on the lower end 48 of neck and head portion 16 or disconnect any other connector used. This permits neck and head portion 16 to be pivoted into the position shown in FIG. 3. The lower edges 64 of keels 60 are shaped as indicated to be similar in configuration to neck and head portion 16 but to extend radially beyond neck and head portion 16 in the collapsed position so that neck and head portion 16 are protected from damage when the decoy has been collapsed.

Referring again to FIG. 1, the operation of the decoy 10 may be understood. After elevating neck and head portion 16 to its upright position and attaching resilient element 56 between hooks 52 and 54, the operator threads lanyard 18 through pulley 22 on anchor 20 and places the decoy in the water at a convenient distance from his hunting blind or observation post. Due to the presence of weights 62 on keels 60, the decoy will remain in the upright position shown in solid lines in FIG. 1. When it is desired to attract water fowl flying over the area to the location near the hunter or naturalist, the actuating segment 24 of lanyard 18 is pulled by the operator. A light tug may cause the decoy to "swim" about on the surface; whereas, a harder pull will eventually cause neck and head portion 16 to pivot relative to body element 14 toward the surface 12 of the body of water. During this pivoting motion, the movement of neck and head portion 16 is resisted by resilient element 56. So long as resilient element 56 is capable of further stretching motion, neck and head portion 16 will pivot relative to body element 14 to a position such as that indicated at numeral 26. At this point, the head of the decoy is submerged to some extent in a position which would be assumed by a natural water fowl when feeding on vegetation or similar matter located quite close to the surface. Further pulling on actuating segment 24 will eventually cause resilient element 56 to reach the limit of its stretching capability, after which the entire decoy will tend to pivot about its center-of-gravity to a position similar to that indicated by numeral 32. Once again, this position 32 closely simulates positions assumed by natural water fowl when feeding upon surface vegetation or similar matter located considerably below the surface in which case the bird will actually "stand on its head" in order to reach the submerged food.

Thus, a water fowl decoy according to my invention closely simulates not only the overall appearance of a water fowl when resting upon the surface of a body of water but also the general appearance of a water fowl when swimming and feeding on subsurface vegetation located at varying depths below the water surface. In addition, my invention includes unique features providing for its compact storage and transportion and for protection of its more delicate members.

Having described my invention in sufficient detail to enable one skilled in the art to make and use it, I claim:

1. A water fowl decoy comprising:
   a buoyant member simulating the appearance of a natural water fowl's body when at rest on the surface of a body of water;
   a neck and head portion pivoted to said body member, simulating the appearance of a natural water fowl's neck and head;
   means connected to said body member and said neck and head portion for restraining said neck and head portion in an elevated position;
   a recess located in the under portion of said body member into which said neck and head portion may be collapsed upon disengagement of said restraining means; and
   weighted keel means attached to said body member on either side of said recess for stabilizing said decoy in an upright position, said keel means being shaped similar to and extending beyond said neck and head portion following its rotation into said recess, for protecting said neck and head portion from damage in its collapsed position.

2. A water fowl decoy, comprising:
   a buoyant body member simulating the appearance of a natural water fowl's body when at rest on the surface of a body of water;
   a neck and head portion pivoted to said body member for forward rotation about an essentially horizontal axis to a position in which at least a portion of said neck and head portion passes beneath said surface, said neck and head portion simulating the appearance of a natural water fowl's neck and head; and
   a resilient member connected to said body member and said neck and head portion whereby said neck and head portion is normally restrained in a elevated position yet said neck and head portion alone may be rotated forward relative to said body member until the limit of the stretching capability of said resilient member is reached, and thereafter said body member and said neck and head portion may be pivoted together forwardly into said body of water.

3. A decoy according to claim 2 further comprising weighted keel means attached to said body member for stabilizing said decoy in an upright position.

4. A decoy according to claim 2 further comprising a recess located in the under portion of said body member into which said neck and head portion may be collapsed upon disengagement of said resilient member means.

5. A decoy according to claim 2, further comprising: means connected to said neck and head portion at a point remote from the pivot joint to said body member for causing said neck and head portion to pivot relative to said body member in opposition to said resilient member until said limit is reached and for causing both said body member and said neck and head portion to pivot together thereafter, whereby said decoy simulates the appearance of a natural water fowl while feeding.

6. A decoy according to claim 4, further comprising weighted keel means attached to said body member on either side of said recess for stabilizing said decoy in an upright position, said keel means being shaped similar to and extending beyond said neck and head portion following its rotation into said recess, for protecting said neck and head portion from damage in its collapsed position.

7. A decoy according to claim 1, further comprising: means connected to said neck and head portion for causing said body member to tip into said water at the head end thereof and to raise from said water at the tail end thereof.

* * * * *